United States Patent [19]

Geary, Jr.

[11] 4,416,581
[45] Nov. 22, 1983

[54] METHOD AND APPARATUS FOR COOLING AN EXPANDER

[75] Inventor: Carl H. Geary, Jr., Greensburg, Pa.

[73] Assignee: Elliott Turbomachinery Co., Inc., Jeannette, Pa.

[21] Appl. No.: 349,402

[22] Filed: Feb. 16, 1982

[51] Int. Cl.³ ............................................. F01D 5/18
[52] U.S. Cl. ..................................... 415/1; 415/115; 416/97 R
[58] Field of Search ................. 415/115, 1; 416/96 R, 416/97 R, 97 A, 181

[56] References Cited

U.S. PATENT DOCUMENTS

| | | | |
|---|---|---|---|
| 2,873,945 | 2/1959 | Kuhn | 415/115 |
| 2,974,925 | 3/1961 | Freche et al. | 253/39.15 |
| 3,211,423 | 10/1965 | Gilbert | 253/39.11 |
| 3,540,811 | 11/1970 | Davis | 416/97 X |
| 3,729,930 | 5/1973 | Williams | 60/39.58 |
| 3,841,786 | 10/1974 | Florjancic | 415/114 |
| 3,927,952 | 12/1975 | Kirby | 416/97 A X |

FOREIGN PATENT DOCUMENTS 156518  5/1954  Australia ............................ 415/115

Primary Examiner—Harvey C. Hornsby
Assistant Examiner—Thomas W. Epting
Attorney, Agent, or Firm—David J. Zobkiw

[57] ABSTRACT

Film cooling of the blades of an expander is achieved by supplying steam generated at the outlet of the expander to a plurality of discharge points. In one embodiment, a plurality of passages are formed in the hub of the expander and underlie each of the vanes. Tubes are located at the inlet end of each vane and form a fluid path with the associated underlying passage and discharge steam over the entire height of the inlet end of the vane. Additional passages provide fluid communication between the underlying passages and the base of the associated vane so that film cooling is supplied to the entire inducer section of the expander.

8 Claims, 4 Drawing Figures

METHOD AND APPARATUS FOR COOLING AN EXPANDER

BACKGROUND OF THE INVENTION

It has long been known that coal can be used to produce gaseous fuel as a result of various chemical reactions. The destructive distillation of bituminous coal produces highly volatile and combustible compounds which are principally hydrocarbons. Water gas, a mixture of carbon monoxide and hydrogen, is made by passing superheated steam over hot carbon (coal). Produce gas, carbon monoxide, is the product of the incomplete combustion of carbon and is produced by passing air/oxygen over hot coal.

In the well-known, currently used coal gasification processes, the various chemical reactions usually take place in the presence of fluidized catalyst and the reaction products are further reacted, as in a methanation reaction, to upgrade the reaction products. Typically, the initial reactants are carbon (coal), steam and oxygen. Where oxygen is supplied as air, it is desirable to remove the coal gasification tail gas from the reaction products. The tail gas is primarily nitrogen and, since its temperature can exceed 1800° F., it is desirable to recover the temperature and pressure therefrom. The high temperature of the tail gas presents difficulties in energy recovery in that an expander wheel cannot maintain its working strength at these temperatures without cooling or other thermal protection. Thermally protecting a rotating member presents great difficulties where cooling of the motive fluid is to be minimized in order to permit greater energy recovery. Additionally, although turbine blades can be made hollow, i.e. with cooling holes, impeller blades cannot.

SUMMARY OF THE INVENTION

The present invention is directed to a method and apparatus for film cooling an expander wheel. A cooling media, such as steam, is supplied to an annular chamber. In one embodiment, a plurality of axially extending passages, one for each vane, are formed in the expander wheel or impeller and extend from the annular chamber to the front of the impeller inducer. A radially extending tube is welded at the front of each vane. Each tube forms a continuous flow path with the associated axially extending passage and distributes a film of cooling media on both sides of the vane through a plurality of radially spaced holes in the sides of the tube. A plurality of axially spaced, essentially radially extending passages extend from each of the axially extending passages through the hub to the base of the respective vane on alternating sides of the vane. The cooling media supplied through the radially extending tubes and passages is swept up by the coal gasification tail gas to provide film cooling of the impeller vanes.

It is an object of this invention to provide a method and apparatus for thermally protecting an expander wheel where the temperature of the motive fluid exceeds that necessary to maintain the working strength of the expander wheel.

It is a further object of this invention to provide a method and apparatus for film cooling a rotating member such as an impeller.

It is a still further object of this invention to provide a method and apparatus for thermally protecting an expansion device with minimal temperature reduction of the motive fluid. These objects, and others as will become apparent hereinafter, are accomplished by the present invention.

Basically, superheated steam is generated in heat exchanger tubes located at the discharge of a radial flow expander which is either of the radially outward or the radially inward type. In the radially outward type, the steam is supplied to an annular chamber from which the steam passes into passages beneath each vane in the expander wheel. The steam flows through each passage to a tube at the front of the impeller inducer which distributes a film of steam on one or both sides of the associated vane. Additional cooling steam flows through the hub to the base of the vanes for vane cooling. In the radially inward type, steam is distributed from an annular chamber directly to a tube at the front of the impeller inducer of each vane and to one or both sides of the base of each of the vanes.

BRIEF DESCRIPTION OF THE DRAWINGS

For a fuller understanding of the present invention, references should now be made to the following detailed description thereof taken in conjunction with the accompanying drawings wherein.

DESCRIPTION OF THE PREFERRED EMBODIMENTS

Figure 1:
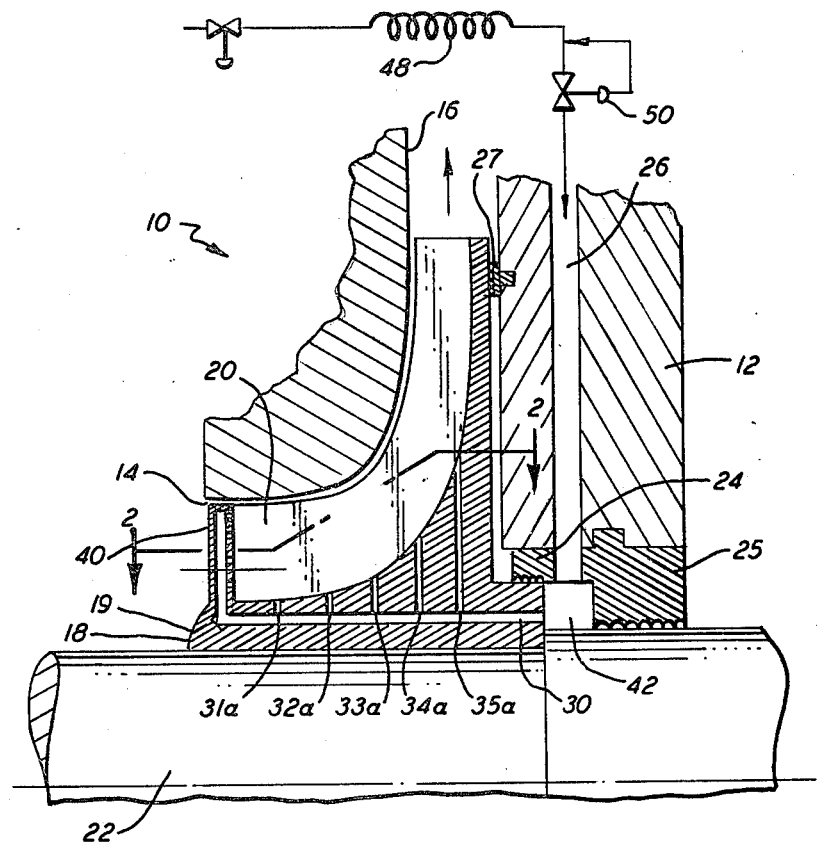
FIG. 1 is a partial sectional view of an axial inlet-radial outlet expansion device employing the present invention.

In FIG. 1, the numeral 10 generally designates a gas expander having a casing 12 with an axial inlet 14 and an oulet 16 which is scroll shaped. The expander wheel 18 includes a hub portion 19 and a plurality of vanes 20 defining an impeller. There is a twist or curve in the inducer or inlet portion of the vanes as is well known in the art. The expander wheel 18 is secured in any suitable conventional manner to the shaft 22 which is operatively connected to an electrical generator (not illustrated) or other suitable power recovery equipment. The expander wheel 18 and shaft 22 are sealed with the casing 12 by seals 24 and 25 which can be the same or separate seals. Thus, as is conventional, gas entering inlet 14 impinges upon the vanes 20 causing expander wheel 18 to rotate and thereby shaft 22 and any operatively connected equipment. However, where gas, such as coal gasification tail gas, impinges upon vanes 20 at a temperature of 1800° F., or more, the vanes are not able to maintain their working strength solely by conventional methods to provide thermal protection for the vanes 20, film cooling is provided by supplying steam according to the teachings of the present invention.

As the gas passes through expander wheel 18 there is a reduction in both temperature and pressure as a result of the expansion process so that additional thermal protection is generally only needed in the inducer portion of the impeller. Additionally, since the hot gas impinges on one side of the vanes 20, the pressure side, the pressure side of the vane has a higher requirement for thermal protection than the suction side. Thus, depending upon design and operating conditions, the thermal protection may only be required on the inducer section and, then only on the pressure side of the vanes. However, in the following description thermal protection of both sides of the vanes in the inducer section will be described.

Figure 2:
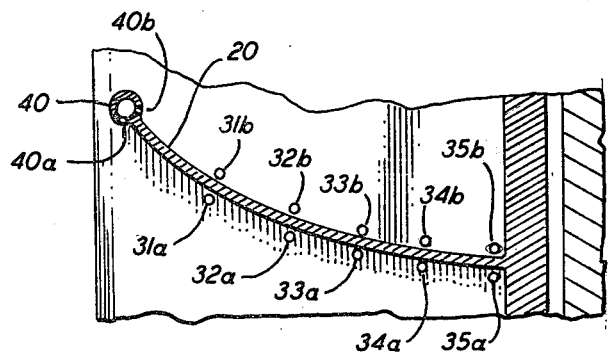
FIG. 2 is a sectional view taken along line 2—2 of FIG. 1.

A generally axially extending passages 30 is drilled in hub 19 beneath each vane 20. Because of the twist or curve in the vanes 20, it may be necessary to form passages 30 in two intersecting segments corresponding to the axial and twisted portions respectively, of the vanes and drilled from opposite ends of the hub. Alternatively, the passage may be in the form of a chord relative to the curve of the pressure side, if suction side cooling is not needed or desired. A plurality of generally radially extending, axially spaced passages extend between each of the passages 30 and the bases of the vanes 20. As best shown in FIG. 1, passages 31a, 32a, 33a, 34a, and 35a extend between passages 30 and the base of the suction side of vane 20. Referring now to FIG. 2, it will be seen that passages 31b, 32b, 33b, 34b and 35b terminate at the base of the pressure side of the vane 20. A tube 40 is welded or otherwise suitably attached to the front of each vane 20 and forms a continuous flow path with the associated passage 30. A plurality of radially spaced holes 40a and 40b are formed in the suction and pressure sides, respectively, of tube 40 and extend over essentially the full height of tube 40. An annular chamber 42 is defined between hub 19, shaft 22 and seals 24 and 25 and is in fluid communication with passages 30. Seal 27 seals between expander wheel 18 and casing 12. A steam generator 48 is connected to a source of water (not illustrated) and is located in outlet 16. The generated steam is controlled by pressure regulator 50 since the steam supplied must be at a higher pressure than the tail gas entering the expander wheel 18 to produce the proper flow. The generated steam from the pressure regulator 50 is supplied via passage 26 in casing 12 to annular chamber 42.

Figure 3:
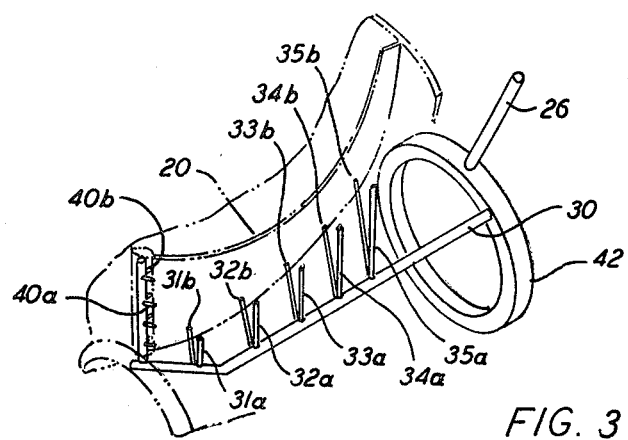
FIG. 3 is a pictorial representation of the cooling media supply structure of the FIG. 1 embodiment.

In operation, hot tail gas enters axial inlet 14 and impinges upon a portion of vanes 20 causing expander wheel 18 and shaft 22 to rotate together with the power recovery equipment attached thereto. As the tail gas passes through the expander wheel 18, the temperature and pressure drop but it is still relatively hot so that the heat transfer from the expanded tail gas contacting steam generator 48 is capable of generating superheated steam. The superheated steam is supplied to annular chamber 42 via passage 26 at a predetermined pressure by pressure regulator 50. The steam supplied to annular chamber 42 is in turn supplied to the rotating, generally axial passages 30 in hub 19. Referring now to FIG. 3, the steam distribution flow paths are illustrated for one of the passages, 30. The steam flows through rotating passages 30 to generally radially extending passages 31a and b, 32a and b, 33a and b, 34a and b, 35a and b and tubes 40. The steam supplied via passages 30 to tubes 40 passes upwardly through tubes 40 and out holes 40a and b. The holes 40a and b are located on the back portions of tubes 40 so that the steam tends to be discharged generally parallel to the tail gas flow. Additionally, the steam supplied at the base of each vane 20 by passages 31a and b, 32a and b, 33a and b, 34a and b and 35a and b is supplied generally parallel to the blades 20. Thus, as the hot tail gas passes through the expander wheel 18, the steam is swept up by the tail gas and tends to flow between the tail gas and the impeller to provide film cooling of the impeller blades.

Figure 4:
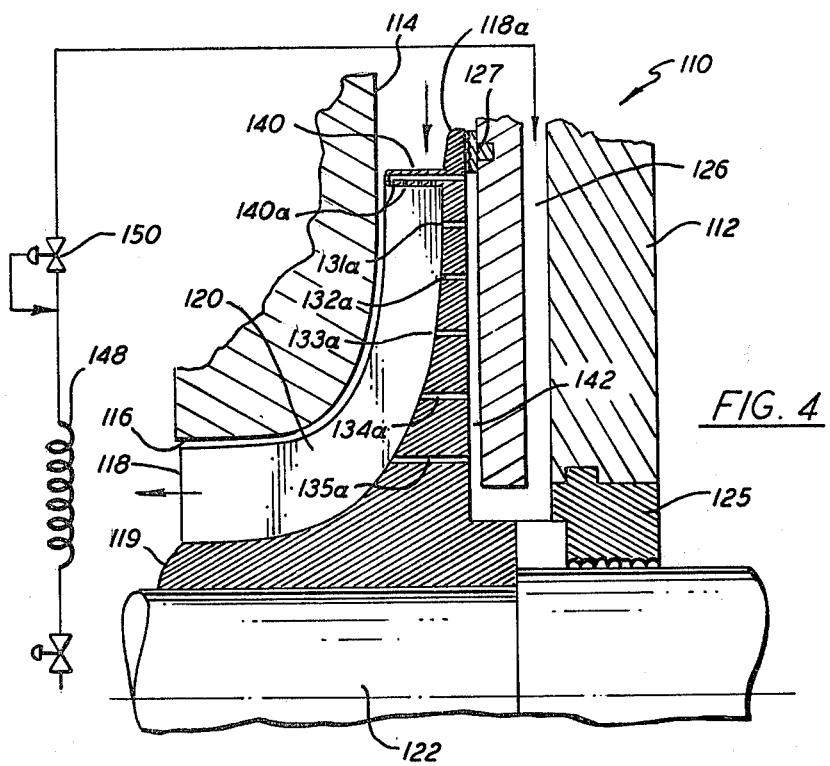
FIG. 4 is a partial sectional view of a radial inlet-axial outlet expansion device employing the present invention.

Although an axial inlet-radial outlet flow expander has been described, the principles of the present invention are applicable to a radial inlet-axial outlet flow expander. FIG. 4 corresponds to FIG. 1 but illustrates a radial inlet-axial outlet flow expander and all structure has been labeled 100 higher than the corresponding structure in FIGS. 1–3. Steam generated in steam generator 148 located in outlet 116 is supplied via passage 126 in casing 112 to annular chamber 142. Annular chamber 142 is formed by expander wheel 118, casing 112 and circumferential labyrinth seal 127. Seal 127 forms a seal with wheel 18 radially outward of each of the tubes 140 due to an extension or lip 118a formed on wheel 118 and this permits fluid communication between tubes 140 and annular chamber 142. Tubes 140, passages 131a, 132a, 133a, 134a and 135a which communicate with the base of the suction side of the vanes 120 and the similar passages (not illustrated) communicating with the base of the pressure side of the vanes 120 corresponding to passages 31b, 32b, 33b, 34b and 35b of FIGS. 2 and 3 each directly communicates with chamber 142 rather than passing through the structure corresponding to passages 30 of the FIGS. 1–3 embodiment. Except for different flow directions for the motive fluid and different steam distribution paths, the operation of the FIG. 4 embodiment is the same as that of the FIGS. 1–3 embodiment and, if renumbered 100 higher, FIG. 2 would illustrate the FIG. 4 embodiment as to the fluid paths. Centrifugal forces are, however, less for a radial inlet device and this becomes significant where erosive catalyst particles are present in the tail gas.

Although preferred embodiments of the present invention has been illustrated and described, other changes will occur to those skilled in the art. For example, cooling fluid other than steam can be used, but air should be avoided if there is a danger of afterburn as where carbon monoxide is present. Also the passages may be located other than beneath the vanes where necessitated by the shape of the vanes if the connecting passages will still distribute the cooling media in the proper locations and directions. Additionally, the number and spacing of the passages leading to the base of the vanes may be varied as to supply less cooling media to the suction side and/or more at the inlet end. It is therefore intended that the scope of the present invention is to be limited only by the scope of the appended claims.

What is claimed is:

1. A method for providing thermal protection to a hot gas expander having solid vanes including the steps of:

rotating the expansion wheel of a hot gas expander by passing hot gas therethrough;

supplying a cooling media to the inlet end of each vane of the rotating expansion wheel;

distributing the cooling media in the direction of hot gas flow over the inlet end of each vane of the expansion wheel for essentially the full height of the vane;

supplying the cooling media to the base of the pressure side of each vane at least over the inducer portion of each vane; and distributing the cooling media over the pressure side of each vane at least over the inducer portion whereby film cooling of the hot gas expander is achieved with minimal cooling of the hot gas.

2. The method of claim 1 further including the steps of:

supplying the cooling media to the base of the suction side of each vane at least over the inducer portion of each vane; and distributing the cooling media over the suction side of each vane at least over the inducer portion.

3. An expander wheel for a hot gas expansion device comprising:

a hub adapted to be drivingly connected to a shaft;

a plurality of uniformly spaced solid vanes formed on said hub and extending from one end which defines an inducer section and has a first height to a second end which has a second height which is less than said first height;

fluid distribution means including a passage formed in said hub beneath each of said vanes with each of said passages extending for a sufficient distance so as to underlie at least said inducer section;

a tube secured at said one end of each of said vanes over said first height and forming a continuous fluid path with the respective underlying passage;

a plurality of spaced holes formed in each of said tubes and directed towards the respective vane and spaced essentially over said first height;

a plurality of passages in said hub which are spaced along one side of the inducer section at the base of each vane and which are in fluid communication with the respective underlying passage.

4. The expander wheel of claim 3 further comprising a plurality of passages in said hub which are spaced along the other side of the inducer section at the base of each vane and which are in fluid communication with the respective underlying passage.

5. In a hot gas expander having an inlet, an outlet and an expander wheel therebetween having a hub with a plurality of solid vanes thereon extending from the inlet which defines an inducer section to the outlet and having a first height at the inlet and a second height at the outlet, the improvement comprising:

a passage formed in said hub beneath each of said vanes with each of said passages extending for a sufficient distance so as to underlie at least said inducer section;

a tube secured at the inlet end of each of said vanes extending for said first height and forming a continuous fluid path with the respective underlying passage;

a plurality of spaced holes formed on each side of each of said tubes and directed towards the respective vane and spaced essentially over said first height; and a plurality of passages in said hub which are spaced along one side of said inducer section at the base of each vane and which are in fluid communication with the respective underlying passage.

6. The hot gas expander of claim 5 further comprising a plurality of passages in said hub which are spaced along the other side of said inducer section at the base of each vane and which are in fluid communication with the respective underlying passage.

7. In a hot gas expander having a casing defining an inlet and an outlet with an expander wheel therebetween having a hub with a plurality of solid vanes thereon extending from the inlet which defines an inducer section to the outlet and having a first height at the inlet and a second height at the outlet, the improvement comprising:

seal means coacting with said hub and said casing to define an annular chamber;

means for supplying cooling media to said annular chamber;

a tube secured at the inlet end of each of said vanes extending for said first height and in fluid communication with said annular chamber;

a plurality of spaced holes formed on at least one side of each of said tubes and directed toward the respective vane and spaced essentially over said first height; and a plurality of passages in said hub which are spaced along one side of said inducer section at the base of each vane and which are in fluid communication with said annular chamber.

8. The hot gas expander of claim 7 further comprising a plurality of passages in said hub which are spaced along the other side of said inducer section at the base of each vane and which are in fluid communication with said annular chamber.

* * * * *